United States Patent
Ingber (10) Patent No.: US 10,902,007 B2
(45) Date of Patent: *Jan. 26, 2021

(54) COMPUTER SYSTEMS AND METHODS FOR ALLOCATING RIGHTS BETWEEN DIVISIONS

(71) Applicant: Lori Barer Ingber, Cleveland Heights, OH (US)

(72) Inventor: Lori Barer Ingber, Cleveland Heights, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/987,112

(22) Filed: May 23, 2018

(65) Prior Publication Data
US 2018/0373720 A1 Dec. 27, 2018

Related U.S. Application Data

(63) Continuation of application No. 12/416,078, filed on Mar. 31, 2009, now abandoned.

(51) Int. Cl.
| G06F 7/00 | (2006.01) |
| G06F 16/2457 | (2019.01) |
| G06Q 10/10 | (2012.01) |
| G06F 16/24 | (2019.01) |
| G06Q 50/22 | (2018.01) |

(52) U.S. Cl.
CPC ........ *G06F 16/24578* (2019.01); *G06F 16/24* (2019.01); *G06Q 10/10* (2013.01); *G06Q 50/22* (2013.01)

(58) Field of Classification Search
CPC .............................................. G06F 16/24578
USPC ......................................................... 707/723
See application file for complete search history.

(56) References Cited

U.S. PATENT DOCUMENTS

| 2002/0091564 A1* | 7/2002 | Geller | G06Q 99/00 705/12 |
| 2006/0064316 A1* | 3/2006 | Wallace | G06Q 10/10 705/7.11 |
| 2007/0265965 A1* | 11/2007 | Springett | G16H 40/63 705/50 |

(Continued)

OTHER PUBLICATIONS

Webpage retrieved from internet archive, WayBackMachine, http://www.adoptex.org (Mar. 28, 2008).

(Continued)

*Primary Examiner* — Eliyah S. Harper
(74) *Attorney, Agent, or Firm* — Morgan, Lewis & Bockius LLP (57) ABSTRACT

The present disclosure provides a method including storing or accessing data representing users of first and second divisions, where the data includes first and second sets of records, receiving a query from a member associated with an organization having access privilege to the data, generating, when the query is from a member of the first division, a score that reflects a degree to which parameters of the query are similar to parameters of data representing users of the second division, where the parameters include characteristics of a family that may adopt a child, generating, when the query is from a member of the second division, a score that reflects a degree to which parameters of the query are similar to parameters of data representing users of the first division, where the parameters include characteristics of a child that may be adopted.

8 Claims, 4 Drawing Sheets

(56) References Cited

U.S. PATENT DOCUMENTS

| | | | | |
|---|---|---|---|---|
| 2009/0070126 A1* | 3/2009 | MacDaniel | ............ | G06Q 30/08 |
| | | | | 705/321 |
| 2009/0070148 A1* | 3/2009 | Skocic | ................... | G06Q 50/22 |
| | | | | 705/3 |
| 2009/0106234 A1* | 4/2009 | Siedlecki | .............. | G06F 16/211 |
| 2010/0250595 A1* | 9/2010 | Ingber | ................... | G06Q 10/10 |
| | | | | 707/771 |
| 2011/0246574 A1* | 10/2011 | Lento | .................... | G06F 16/958 |
| | | | | 709/204 |
| 2015/0348174 A1* | 12/2015 | Purvis, Jr. | .......... | G06Q 30/0621 |
| | | | | 705/26.5 |

OTHER PUBLICATIONS

Dellavecchio, 2000, "Unofficial Guide to Adopting a Child," IDG Books Worldwide, Inc., Foster City, CA, pp. 23-74.

Falker, 2006, "The Ultimate Insiders Guide to Adoption," Hachette Book Group USA, New York, NY, Chapters 4 and 5.

Herman, 2002, "The Paradoxical Rationalization of Modern Adoption," Journal of Social History 36 pp. 339385.

Hollinger, 1995, "The Uniform Adoption Act," The Future of Children 5 pp. 205-211.

Hunt, Aug. 1972, "Obstacles to Interstate Adoption," Child Welfare League of America, Inc., New York, NY.

Johnston, 2008, "Adopting, Sound Choices, Strong Families," Perspectives Press, Inc., Indianapolis, IN, Chapter 11.

Mintzer, 2003, "Yes, You Can Adopt!" Carroll & Graf Publishers, Chapters 5, 6 and 7.

Stolley, 1993, "Statistics on Adoption in the United States," Adoption, 3 pp. 26-42.

\* cited by examiner

Fig. 1

| First class of adoption participants | — 50 |
|---|---|
| Identity of member 1 in first class | — 52-1 |
|     Request parameter 1 of member 1 | — 202-1-1 |
|     ⋮ | |
|     Request parameter X of member 1 | — 202-1-X |
|     Characteristic 1 of child | — 204-1-1 |
|     ⋮ | |
|     Characteristic Y of child | — 204-1-Y |
|     Characteristic 1 of birth parent | — 206-1-1 |
|     ⋮ | |
|     Characteristic Z of birth parent | — 206-1-Z |
| Identity of member 2 in first class | — 52-2 |
|     Request parameter 1 of member 2 | — 202-2-1 |
|     ⋮ | |
|     Request parameter X of member 2 | — 202-2-X |
|     Characteristic 1 of child | — 204-2-1 |
|     ⋮ | |
|     Characteristic Y of child | — 204-2-Y |
|     Characteristic 1 of birth parent | — 206-2-1 |
|     ⋮ | |
|     Characteristic Z of birth parent | — 206-2-Z |
| Identity of member 3 in first class | — 52-3 |
|     Request parameter 1 of member 3 | — 202-3-1 |
|     ⋮ | |
|     Request parameter X of member 3 | — 202-3-X |
|     Characteristic 1 of child | — 204-3-1 |
|     ⋮ | |
|     Characteristic Y of child | — 204-3-Y |
|     Characteristic 1 of birth parent | — 206-3-1 |
|     ⋮ | |
|     Characteristic Z of birth parent | — 206-3-Z |
| ⋮ | |
| Identity of member N in first class | — 52-N |

Fig. 2

| | |
|---|---|
| Second class of adoption participants | ⟍ 54 |
| Identity of member 1 in second class | ⟍ 56-1 |
| Request parameter 1 of member 1 | ⟍ 302-1-1 |
| ⋮ | |
| Request parameter X of member 1 | ⟍ 302-1-X |
| Characteristic 1 of member 1 | ⟍ 304-1-1 |
| ⋮ | |
| Characteristic Y of member 1 | ⟍ 304-1-Y |
| Identity of member 2 in second class | ⟍ 56-2 |
| Request parameter 1 of member 2 | ⟍ 302-2-1 |
| ⋮ | |
| Request parameter X of member 2 | ⟍ 302-2-X |
| Characteristic 1 of member 2 | ⟍ 304-2-1 |
| ⋮ | |
| Characteristic Y of member 2 | ⟍ 304-2-Y |
| Identity of member 3 in first class | ⟍ 56-3 |
| Request parameter 1 of member 3 | ⟍ 302-3-1 |
| ⋮ | |
| Request parameter X of member 3 | ⟍ 302-3-X |
| Characteristic 1 of member 3 | ⟍ 304-3-1 |
| ⋮ | |
| Characteristic Y of member 3 | ⟍ 304-3-Y |
| ⋮ | |
| Identity of member M in second class | ⟍ 52-M |
| ⋮ | |

COMPUTER SYSTEMS AND METHODS FOR ALLOCATING RIGHTS BETWEEN DIVISIONS

CROSS REFERENCE TO RELATED APPLICATION

This application is a continuation of U.S. patent application Ser. No. 12/416,078, filed Mar. 31, 2009, all entirely incorporated herein by reference for all purposes.

1. FIELD OF THE INVENTION

Improved computer and systems and methods for allocating rights between divisions.

2. BACKGROUND OF THE INVENTION

In many instances, the traditional approach to adoption has been a "closed adoption." The birth parents sign over their parental rights to the adoption agency and the adoptive parents are called and informed that there is a child available for them to adopt. The birth parents and the adoptive parents never meet or share identifying information about each other. Often there is never any contact of any kind between the adopted child and the biological parents.

Gaining in some popularity are "open adoptions." An open adoption involves the birth and adoptive parents meeting, usually before the baby's birth, and sharing personal information, including last names, phone numbers, addresses, and a desire and commitment to maintain an ongoing relationship. The form of relationship varies widely. On one end of the spectrum there are adoptive and birth parents that will visit frequently or at least regularly. At the other end of the spectrum are families that stay in close contact but perhaps don't visit often, if at all. The defining characteristics of an open adoption are that there is no secrecy, the birth parents and adoptive parents know where the other lives, and they can contact each other independent of an adoption agency or attorney by calling, writing or sending e-mail.

The most common forms of adoption are "semi-open adoptions." In this type of adoption the birth and adoptive parents probably meet at some point, and at the very least they speak on the phone. They share first names and perhaps the state where they each live, but they do not share more information about themselves or commit to having an ongoing personal relationship.

The traditional approach to facilitating adoption has been an "agency-assisted adoption" in which adoptive parents engage an adoption agency, pay for their services, and adopt a child. The agency does everything, including locating the birth parents (or conversely locating the adoptive parents), assisting in making the match between the birth and adoptive parents, providing all counseling and other support services, including providing whatever monetary assistance the agency may legally give to the birth parents, and completing all legal services necessary to finalize the adoption. These traditional agency-assisted adoptions have typically been closed adoptions.

An alternative to "agency-assisted adoptions" are "independent adoptions" in which adoptive parents advertise for a suitable birth parents or, conversely, birth parents advertise for suitable adoptive parents without the use of an adoption agency. The parties then contact each other directly and arrange the adoption. Typically, in the independent adoption approach, an attorney assists the birth parents and/or adoptive parents in all aspects of the adoption process, including assisting or advising on how to locate each other as well as by managing the process after the birth parents and adoptive parents have located each other.

Today, because of the growing popularity of open adoptions and semi-open adoptions that provide for birth parents to select from advertisements placed by adoptive parents and vice versa, many agencies have broadened their policies so that they are no longer limited to closed adoptions. Nonetheless, this does not mean the traditional agency-assisted adoption in which a closed adoption is pursued is not a suitable method for some birth parents and adoptive parents.

In order to support the growing popularity of open adoptions and semi-open adoptions, many agencies today have programs in which birth parents and adoptive parents meet each other. Adoptive parents who want to talk and meet with the birth parents will select an agency with such a program. Birth parents who want to be involved in the placement of their baby will go to an agency where they are afforded the opportunity to evaluate the prospective adoptive parents. In some cases, the birth parents may or may not want to contact the prospective adoptive parents once the birth parents have made their selection. Thus, there are many types of programs designed to meet the emotional needs of both birth and adoptive parents.

Further, with the increased popularity of open adoptions and semi-open adoptions has come the advent of "agency identified adoptions," also known as the "identified adoptions" An agency identified adoption is one in which the adoptive parents locate birth parents (or the birth parents locate the adoptive parents), and then ask an adoption agency to take over the rest of the adoption process. The term "identified adoptions" means that the birth parents find the adoptive parents and then "identify" the match to an adoption agency to finalize the adoption or conversely the adoptive parents find the birth parents and then "identify" the match to an adoption agency to finalize the adoption. In more detail, in an "identified adoption," the adoptive parents advertise to locate birth parents. Alternatively, the birth parents advertise to locate the adoptive parents. When adoptive parents find suitable birth parents, the adoptive parents call the agency as opposed to calling the birth parents directly as in the case of an independent adoption. Conversely, when the birth parents find suitable adoptive parents, the birth parents call the agency as opposed to calling the adoptive parents. The use of the agency in this manner has the advantage that experienced case workers serve as an interface between the adoptive parents and the birth parents. The adoption agency helps facilitate the adoption process by providing counseling to either or both parties and guides the adoptive parents through the paperwork and home study. The agency pulls together all aspects of the adoption plan and may or may not provide the adoptive parents with an attorney. In this way, the process is a hybrid of an independent adoption and an agency-assisted adoption. Prospective adoptive parents are spared waiting lists of agencies by finding the birth parents themselves, but reap the other benefits of agencies, such as their experience with adoption legalities and their counseling services.

Between the traditional agency-assisted adoptions and agency identified adoptions, there are many variations. Agencies today usually let the birth parents select adoptive parents after reading their biographies, portfolios, and/or "Dear Birth Family" letters. Birth parents are having a far greater say in the home that will be found for their baby than ever before. How much choice they have in placement and the degree of pre-adoption communication with the adoptive parents varies from situation to situation.

Agencies can be divided into three different classes: public, non-profit private, and for-profit private. Public agencies are funded by tax dollars and are the local branches of state social service agencies. Most public agencies handle only special needs adoptions and do not do international adoptions. Private agencies, on the other hand, do both domestic and international adoptions, although an agency may choose to specialize in one particular area of adoption. In many instances, non-profit agencies contribute to the welfare of children who are considered challenging to place by making financial contributions to the orphanages with whom they arrange adoptions, although many for-profit agencies do as well. All adoption agencies are required to be licensed in the state in which they are operating. Examples of agencies include, but are not limited to the Deaconess Pregnancy and Adoption Services (Oklahoma City, Okla.) specializing in adoption of U.S. infants and older U.S. children, Adoptive Family Services (Saint Albans, West Virginia) specializing in U.S. infants, Adoption Associates, Inc. (Saginaw, Mich.) specializing in U.S. infants, international adoption, and international special needs adoption, and Adoption Minnesota (Minneapolis, Minn.) specializing in U.S. infants. There are thousands of adoption agencies in the United States. A listing of these adoption agencies is found at the Adoptive Families website.

Advances in computer technology and the advent of globally connected computing networks, such as the Internet, have opened up many opportunities for both agency-assisted adoptions and agency-identified adoptions.

In the case of agency-assisted adoptions, agencies can provide confidential websites that allow prospective adoptive parents to submit biographies, portfolios, and/or "Dear Birth Family" letters over the Internet. Likewise, such agencies can provide confidential websites that allow birth parents to submit information about themselves and the child that they wish to put up for adoption. The agencies then find a match between the prospective adoptive parents and the birth parents.

In the case of identified adoptions, prospective adoptive parents advertise for suitable birth parents through personal biographies, portfolios, and/or "Dear Birth Family" letters posted on various Internet websites, blogs, e-mail postings, chat rooms, or social networking sites. Alternatively or additionally, birth parents can advertise for suitable adoptive parents through posts on various Internet websites, blogs, e-mail postings, chat rooms, or social networking sites. Once the parties have found each other they can then approach an agency to complete the adoption.

While, as described above, advances in computer technology and the advent of globally connected computing networks, such as the Internet, have provided new and improved ways for birth parents and adoptive parents to find each other, with or without agency assistance, drawbacks remain. In the case where the parties do not use an agency to find each other, the parties have the difficulty of screening each prospective party to make sure they are a suitable match. Often the parties are not sufficiently skilled or informed on ways to screen for suitable partners. For example, in the case of prospective adoptive parents, the prospective adoptive parents may not know what questions to ask or what warning signs to look for when screening for appropriate birth parents. Thus, although advances in computer technology and the advent of globally connected computing networks gets the message from the birth parents and the adoptive parents out to a wider audience, the globally connected computing networks do little or nothing to filter through all the prospective adoptive parents and/or birth parents to find an appropriate match.

The use of advances in computer technology and the advent of globally connected computing networks in the agency-assisted adoption context improve the situation because agencies can cull a database of prescreened birth parents and/or adoptive parents. Thus, such agencies make use of advances in computer technology and the advent of globally connected computing networks to provide greater access to birth parents and adoptive parents while at the same time performing essential screening activities. Such agency-assisted adoptions can be closed adoptions, open adoptions, or semi-open adoptions. However, even in these instances, a drawback remains. As noted above, there are thousands of adoption agencies in the United States alone. Moreover, typically, prospective adoptive parents as well as birth parents sign up with only one of these agencies. As a result, prospective adoptive parents only have access to the selection of birth parents prescreened by the agency and culled in the database of their (one) adoption agency. Likewise, birth parents wishing to choose a home for their baby only have access to the selection of prospective adoptive parents prescreened by the agency and culled in the database of their adoption agency.

One example of a service that provides information about children from several different agencies is www.adoption.com. While this service serves a significant need, it has drawbacks. First, it does not provide privacy to the children that are available for adoption. Pictures of the children and personal information about the children are available for everyone to see. Second, the service is not reciprocal: while adoptive parents can search for suitable children, birth parent cannot use the service to search for suitable adoptive parents. Finally, www.adoption.com is largely directed to children with special disabilities rather than children that have not been born or were just born.

Given the above background, what is needed in the art are improved systems and methods for facilitating the matching of adoptive parents with children.

3. SUMMARY OF THE INVENTION

The shortcomings found in the prior art are addressed by the computer systems and methods disclosed herein. One embodiment provides a computer based processing method for organizing, maintaining and processing a data store that is stored on a tangible computer readable media. The data store is for use by a first class of adoption participants and a second class of adoption participants. In one example, the first class of adoption participants are birth parents and the second class of adoption participants are adoptive parents.

In preferred embodiments, the data store is not available to the public. In such embodiments, all or some of the members of the first class of adoption participants and all or some of the members of the second class of adoption participants have been granted an access privilege to the data store.

An electronic query of the data store is initiated on behalf of a first member of the first class of adoption participants or a second member of the second class of adoption participants upon verification that such member has access privileges to the data store.

In a first example, a set of birth parents may send an adoption agency that has access to the data store a request to find suitable adoptive parents that are represented in the data store. The adoption agency may receive this request from the set of birth parents by telephone, by web site query, by a digital message (e.g., a multimedia message service messages, an enhanced message service message, short message service messages, an e-mail, an Internet-based instant messaging service message, or an exchange instant messaging messages) or by other means such as an in person visit. The adoption agency, on behalf of the set of birth parents, may then initiate the electronic query of the data store.

In a second example, a set of adoptive parents may send an adoption agency that has access to the data store a request to find suitable birth parents (or newborn child) that are represented in the data store. The adoption agency may receive this request from the set of adoptive parents by telephone, by web site query, by a digital message or by other means such as an in person visit. The adoption agency, on behalf of the set of birth parents, may then initiate the electronic query of the data store.

In a third example, a set of birth parents that have access privileges to the data store may query the data store directly in order to find suitable adoptive parents that are represented in the data store. However, in preferred embodiments, the access privileges of the birth parents to the data store in such instances may be substantially limited in order to protect privacy rights of the adoptive parents. So, for example, the set of birth parents may only have access privileges to the data store for determining basic information such as the names of agencies that have adoptive parents that match certain criteria imposed by the birth parents. When matches are found by the birth parents in such instances, the birth parents would then need to contact either their agency or the agencies found in the search in order to facilitate an adoption.

In a fourth example, a set of adoptive parents that have access privileges to the data store may query the data store directly in order to find suitable birth parents or suitable children of birth parents that are represented in the data store. However, in preferred embodiments, as was the case in the third example, the access privileges of the adoptive parents in such instances may be substantially limited in order to protect the privacy rights of the birth parents and the children of the birth parents. So, for example, the set of adoptive parents may only have access privileges to the data store that enable the adoptive parent to determine basic information, such as the names of agencies that have, or are expected to have in the near future, children meeting certain criteria imposed by the adoptive parents.

When the electronic query is on behalf of a first member (e.g., a set of birth parents), the electronic query includes a first plurality of request parameters that collectively define a first plurality of characteristics of a qualifying family that may adopt an unborn or newly born child from the first member. Examples of such request parameters include, but are not limited to, a minimum age requirement, a maximum age requirement, a marital status requirement, a sexual orientation requirement, a nationality requirement, a minimum years of marriage requirement, a maximum number of divorces per spouse requirement, a health requirement, a maximum body mass index requirement, an income requirement, a maximum family size requirement, and a religious orientation requirement for a prospective member of the second class (e.g., the adoptive parent) in the data store.

When the electronic query is on behalf of a second member (e.g., a set of adoptive parents), the electronic query includes a second plurality of request parameters that collectively define a second plurality of characteristics of (i) a qualifying unborn child or newly born child that may be adopted by the second member and, optionally, (ii) a birth parent of the unborn child or newly born child. Examples of such request parameters include, but are not limited to, a date when the baby is expected to be born, the sex of the baby, the nationality of the baby, a health requirement of the birth mother, and/or a human immunodeficiency virus status of a birth parent.

The data store disclosed herein comprises or has access to a plurality of records. Each respective record in the plurality of records is either associated with (i) a member of the first class of adoption participants or (ii) a member of the second class of adoption participants. In other words, each record in the database contains information about a member of the first class of adoption participants or a member of the second class of adoption participants. In the example where the first class of participants are birth parents and the second class of participants are adoptive parents, each record in the database contains information about a set of birth parents or a set of adoptive parents.

Advantageously, the data store includes records from a plurality of different adoption agencies. In one exemplary embodiment, the plurality of records comprises a first set of records from a first adoption agency and a second set of records from a second adoption agency. In some embodiments, the data store includes records from two or more adoption agencies, three or more adoption agencies, four or more adoption agencies, five or more adoption agencies, ten or more adoption agencies, or twenty or more adoption agencies. This is highly advantageous because the first class of adoption participants and/or the second class of adoption participants gain access to the records of multiple adoption agencies even in instances where they have a contractual relationship or other form of agreement with only a single adoption agency. By gaining access to the records of multiple adoption agencies in this confidential manner, the time that it takes for adoptive parents to find a suitable baby is considerably reduced. Moreover, by gaining access to the records of multiple adoption agencies in this confidential manner, the time that it takes for birth parents to find suitable adoptive parents is considerably reduced, thus benefiting both parties.

In the systems and methods disclosed herein, the data store is searched with the electronic query using a computer, thereby obtaining a search result comprising one or more records in the plurality of records that match the electronic query. However, in preferred embodiments, members of the first class of adoption participants (e.g., birth parents) do not find out information about other members of the first class of participants in the data store. Correspondingly, in preferred embodiments, members of the second class (e.g., adoptive parents) do not find out information about other members of the second class of participants in the data store. Thus, when the electronic query is by or on behalf of a first member, each record in the search result is associated with a member in the second class of adoption participants and, when the electronic query is by or on behalf of the second member, each record in the search result is associated with a member in the first class of adoption participants.

In optional embodiments, the search result is outputted to a display, a tangible computer readable data storage product, a computer, or a tangible random access memory and is thereby used either by the agency or by the first or second member that initiated the search to find a match between birth parents and adoptive parents.

In many instances herein, examples are provided in which one adoption participant was a set of birth parents and another adoption participant was a set of adoptive parents. These examples were given merely to facilitate comprehension of the disclosed systems and methods. It will be appreciated by one of ordinary skill in the art that the disclosed systems and methods can be used in instances where there is only a single birth parent (e.g., the identity of the birth father is either not known, the birth father has relinquish all rights to the baby by operation of law or agreement, etc.) or a child alone (where the child is born and the adoption agency has custody) or a single adoptive parent.

In some embodiments, the described systems and methods facilitate a closed adoption. In some embodiments, the described systems and methods facilitate an open adoption. In some embodiments, the described systems and methods facilitate a semi-open adoption. In some embodiments, the described systems and methods facilitate an agency-assisted adoption.

4. BRIEF DESCRIPTION OF THE DRAWINGS

Like reference numerals refer to corresponding parts throughout the several views of the drawings.

5. DETAILED DESCRIPTION

Disclosed are computer based processing methods for organizing, maintaining and processing a data store for use by a first and second class of adoption participants that have access privilege to the data store as well as computer systems that implement such methods. An electronic query of the data store is initiated on behalf of a first member of the first class or a second member of the second class upon verification of these access privileges. When the electronic query is for the first member, the query includes a first plurality of request parameters that collectively define characteristics of a qualifying family that may adopt an unborn or newly born child from the first member. When the electronic query is for the second member, the electronic query includes a second plurality of request parameters that define characteristics of (i) a qualifying unborn child or newly born child that may be adopted by the second member and, optionally, (ii) a birth parent of the unborn child or newly born child. Each record in the data store is either associated with a member of the first or second class of adoption participants. The data store comprises a first set of records from a first adoption agency and a second set of records from a second adoption agency. The data store is searched with the electronic query thereby obtaining a search result comprising one or more records that match the electronic query.

As used herein, a newly born child refers to a baby that is less than one year of age, less than six months of age, less then three months of age, less than one month of age, or less than two weeks of age.

5.1. Exemplary Computer Implementation

Now that an overview of one embodiment of the disclosed systems and methods has been described, an exemplary system that supports the functionality of embodiments of the application will be described in conjunction with FIG. 1. The system is preferably a computer system 10 having:

one or more central processing units 22;

a main non-volatile storage unit 14, for example a hard disk drive, for storing software and data, the storage unit 14 controlled by storage controller 12;

a system memory 36, preferably high speed random-access memory (RAM), for storing system control programs, data, and application programs, comprising programs and data loaded from non-volatile storage unit 14; system memory 36 may also include read-only memory (ROM);

a user interface 32, comprising one or more input devices (e.g., keyboard 28) and a display 26 as well as other input and output devices (e.g., a mouse);

a network interface card 20 (communications circuitry) for connecting to any wired or wireless communication network 34 (e.g., a wide area network such as the Internet);

an internal bus 30 for interconnecting the aforementioned elements of the system; and a power source 24 to power the aforementioned elements.

Operation of system 10 is controlled primarily by operating system 40, which is executed by a central processing unit 22. Operating system 40 can be stored in system memory 36. In a typical implementation, system memory 36 includes:

file system 42 for controlling access to the various files and data structures;

a user interface module 44 for facilitating the initiation of an electronic query;

a data store query module 46 for executing the electronic query; and a data store 48, the data store comprising or having access to a plurality of records, each respective record in the plurality of records being associated with either (i) a member of a first class of adoption participants (e.g., birth parents) or (ii) a member of a second class of adoption participants (e.g., adoptive parents), the plurality of records comprising, at a minimum, a first set of records from a first adoption agency and a second set of records from a second adoption agency.

Figure 1:
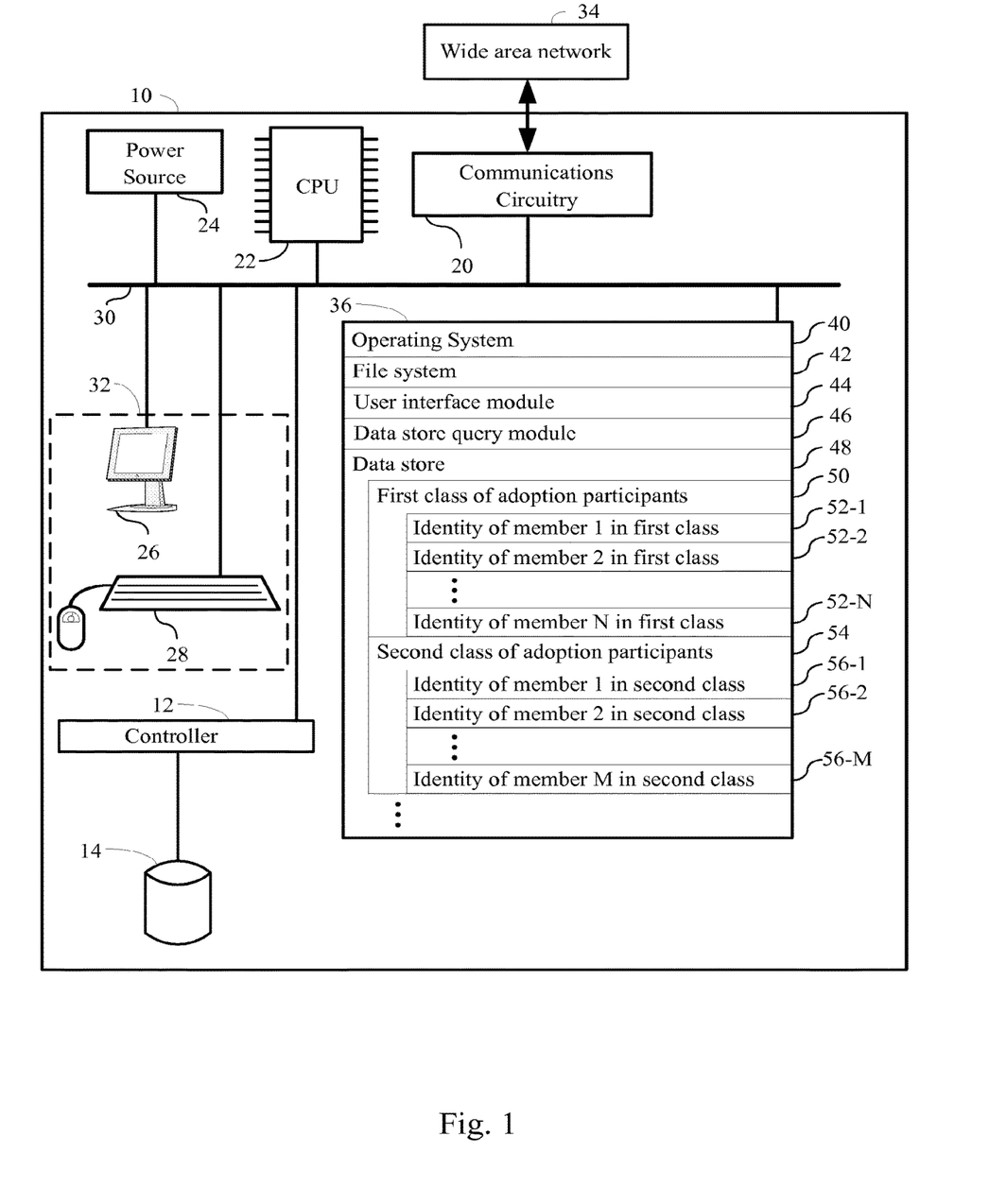
FIG. 1 illustrates an exemplary computer system for facilitating adoption in accordance with the disclosed systems and methods.

As illustrated in FIG. 1, in some embodiments data store 48 comprises records for a first class of adoption participants 50 and a second class of adoption participants 54. In some embodiments, data store 48 only has records for a first class of adoption participants. In some embodiments, data store 48 only has records for a second class of adoption participants.

The first class of adoption participants comprises a plurality of members 52. In one example, the first class of adoption participants is birth parents and thus, in such instances, each of the members in the first class of adoption participants is a birth parent or a set of birth parents. In some embodiments, the first class of adoption participants comprises ten or more birth parents, twenty or more birth parents, thirty or more birth parents, forty or more birth parents, one hundred or more birth parents, one thousand or more birth parents, ten thousand or more birth parents, or fifty thousand or more birth parents. In some embodiments, the first class of adoption participants comprises adoption participants from two or more counties in a state in the United States of America, two or more states in the United States of America, or two or more countries.

The second class of adoption participants in data store 48 comprises a plurality of members 56. In one example, the second class of adoption participants is adoptive parents and thus, in such instances, each of the members in the second class of adoption participants is an adoptive parent or a set of adoptive parents (adoptive family). In some embodiments, the second class of adoption participants comprises ten or more adoptive parents, twenty or more adoptive parents, thirty or more adoptive parents, forty or more adoptive parents, one hundred or more adoptive parents, one thousand or more adoptive parents, ten thousand or more adoptive parents, or fifty thousand or more adoptive parents. In some embodiments, the second class of adoption participants comprises adoption participants from two or more counties in a state in the United States of America, two or more states in the United States of America, or two or more countries.

Figure 2:
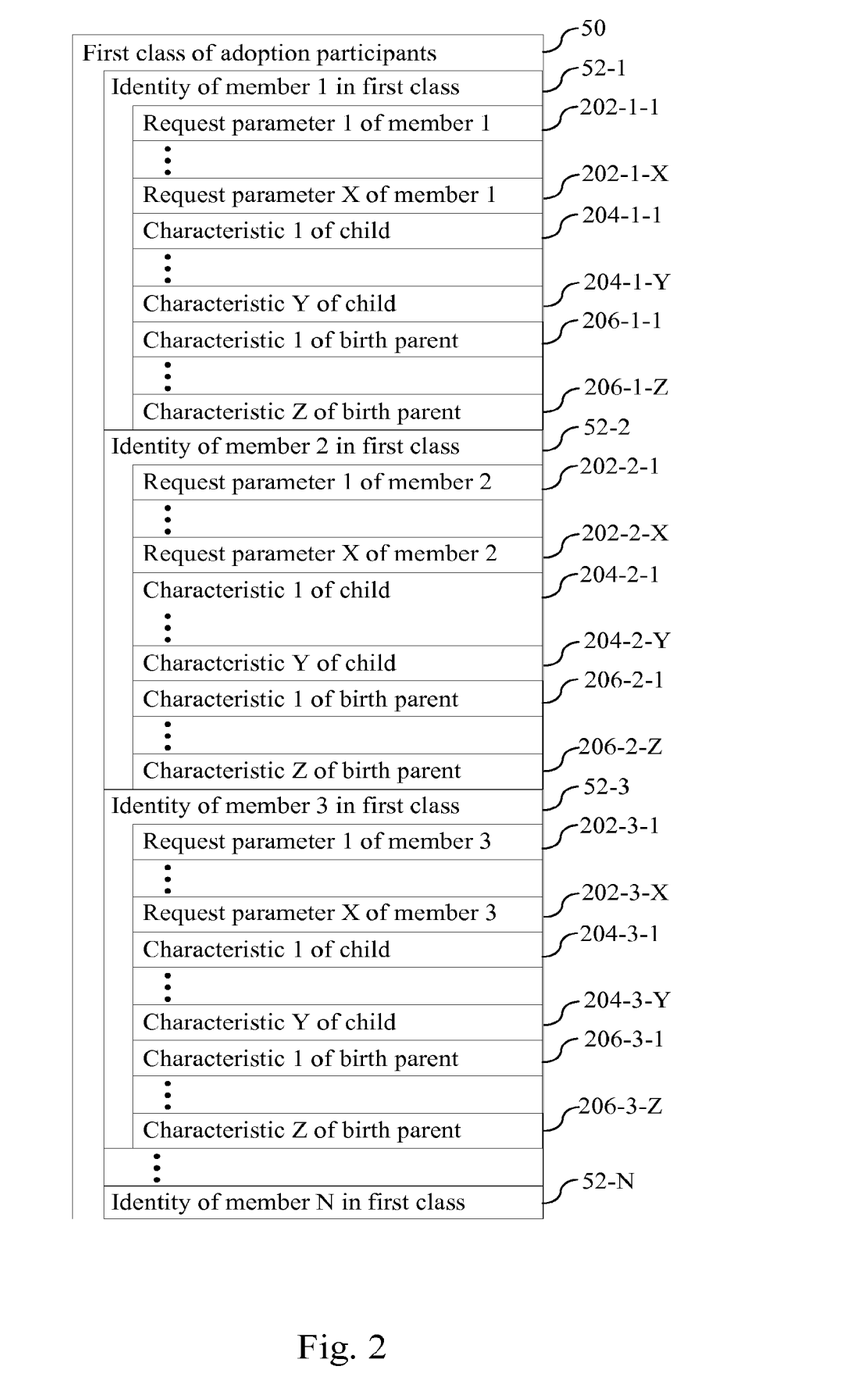
FIG. 2 illustrates an exemplary data structure for storing information about a first class of adoption participants (e.g., birth parents) in accordance with the disclosed systems and methods.

In typical embodiments, data store 48 includes a considerable amount of information for each adoption participant or set of adoption participants. FIG. 2, for example, shows exemplary information that can be stored for each member in the first class of adoption participants 52 in records in data store 48 in the case where the first class represents birth parents. Two nonlimiting exemplary categories of information that can be stored for birth parents are (i) request parameters 202 that collectively define characteristics that a qualifying family must have in order to adopt an unborn or newly born child from such birth parents and (ii) characteristics 204 of the unborn or newly born child that the birth parents have put up for adoption and optionally characteristics 206 of the birth parents themselves. The request parameters 202 are used to find qualifying adoptive parents while the characteristics 204 of the child being put up for adoption as well as optionally the birth parents are used by prospective adoptive parents to find the birth parents.

Examples of request parameters 202 that collectively define characteristics that a qualifying family must have in order to adopt an unborn or newly born child from birth parents may include, but are not limited to, a minimum age requirement, a maximum age requirement, a marital status requirement, a sexual orientation requirement, a nationality requirement, a minimum years of marriage requirement, a maximum number of divorces per spouse requirement, a health requirement, a maximum body mass index requirement, an income requirement, a maximum family size requirement, and/or a religious orientation requirement. For example, the birth parents may require that the prospective adoptive parents be of a minimum age (e.g. 20 years of age, 21 years of age, 22 years of age, 23, years of age, 24 years of age, 25 years of age, etc.), a maximum age requirement (e.g. 35 years of age, 40 years of age, 45 years of age, 50, years of age, 55 years of age, 60 years of age, etc.), a marital status requirement (e.g., married, in a domestic partner relationship, etc.), a sexual orientation requirement (e.g., heterosexual, gay, etc.), a nationality requirement, a minimum years of marriage requirement (e.g., two years, three years, four years, five years, etc.), a maximum number of divorces per spouse requirement (e.g., zero, one, two, three, etc.), a health requirement (e.g., no disability, etc.), a maximum body mass index requirement (e.g., 42, 41, 40, 39, etc.), an income requirement (e.g., a family income of $20,000 or greater, a family income of $25,000 or greater, a family income of $30,000 or greater, a family income of $35,000 or greater), a maximum family size requirement (e.g., no more than one existing sibling, no more than two existing siblings, no more than three existing siblings, etc.) and/or a religious orientation requirement. Each set of birth parents may set their own unique request parameters in line with their own desires and beliefs.

In some embodiments the characteristics 202, for a particular member 52 in the first class of adoption participants 50, impose the requirement that a qualifying prospective adoptive parent be at least 30 years old and under the age of 50, and married for a minimum two years of marriage. In some embodiments the characteristics 202 impose the requirement, for a particular member 52 in the first class of adoption participants 50, that if one or both of the prospective adoptive parents were previously married, the prospective adoptive parents be married to each other a minimum of five years. In some embodiments the characteristics 202, for a particular member 52 in the first class of adoption participants 50, impose the requirement that there be no more than two divorces per prospective adoptive parent. In some embodiments the characteristics 202, for a particular member 52 in the first class of adoption participants 50, impose the requirement that the prospective adoptive parents are healthy, both mentally and physically. For instance, in some embodiments the characteristics 202, for a particular member 52 in the first class of adoption participants 50, impose the requirement that prospective adoptive parents have no physical or mental handicaps including, but not limited to: blindness, deafness, severe facial deformities, and/or physical disabilities. Further, in some embodiments the characteristics 202, for a particular member 52 in the first class of adoption participants 50, impose the requirements that the prospective adoptive parents have a body mass index of less than 40 and not have been treated for a mental disorder (including depression) in the last two years. In some embodiments the characteristics 202, for a particular member 52 in the first class of adoption participants 50, impose the requirement that the prospective adoptive parents not have a criminal history, or only minor less severe criminal convictions. In some embodiments the characteristics 202, for a particular member 52 in the first class of adoption participants 50, impose the requirement that the prospective adoptive parents not have a history of drug or alcohol abuse, including the abuse of prescription medications. In some embodiments the characteristics 202, for a particular member 52 in the first class of adoption participants 50, impose the requirement that the prospective adoptive parents have a minimum net worth (e.g., $80,000) including a minimum annual income per prospective family member (e.g., $10,000) including the adopted child, for a minimum income of $30,000 a year for a family of three. In some embodiments the characteristics 202, for a particular member 52 in the first class of adoption participants 50, impose the requirement that the income requirement cannot be satisfied by pensions, unemployment insurance, training grants, or other government funds. In some embodiments the characteristics 202, for a particular member 52 in the first class of adoption participants 50, impose the requirement that the prospective adoptive parents have four children or fewer already in the home, and that the youngest child be at least a year old.

Examples of characteristics 204 of the child being put up for adoption as well as optionally the birth parents are used by prospective adoptive parents to find the adoptive parents. Examples of such characteristics 204 include, but are not limited to, a date the baby is expected to be born, the sex of the baby, the nationality of the baby, a health requirement of the birth mother, and/or a human immunodeficiency virus status of the birth mother.

Figure 3:
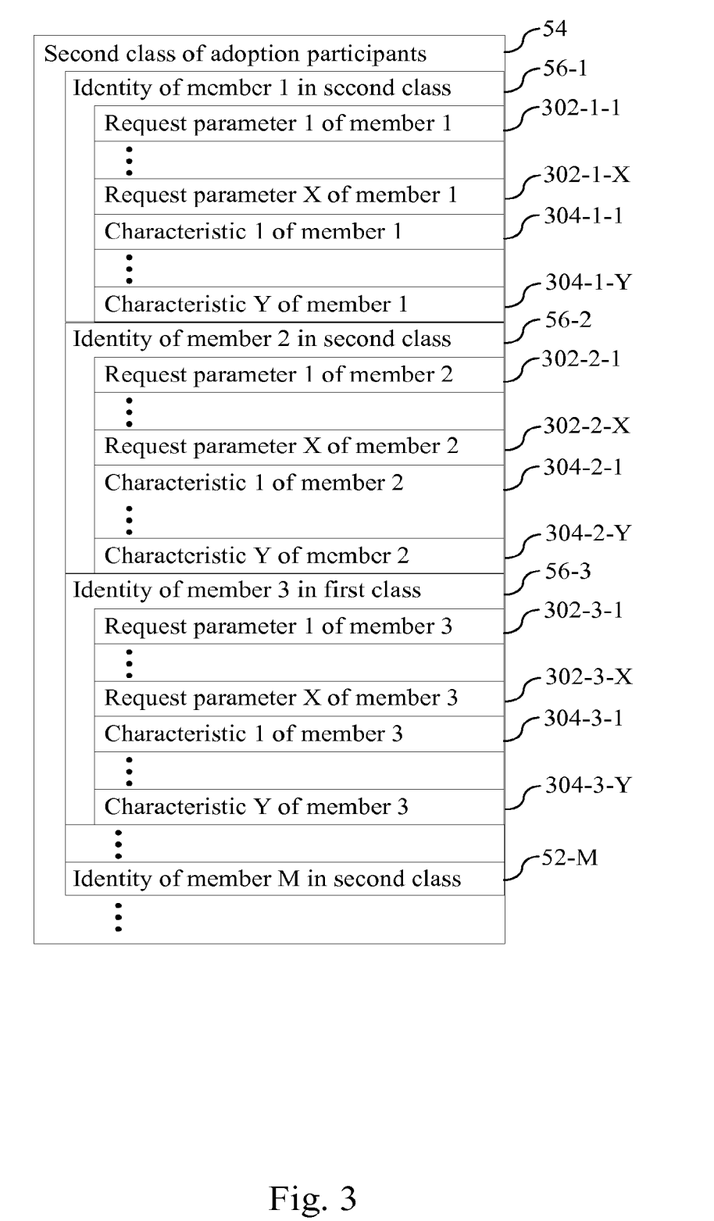
FIG. 3 illustrates an exemplary data structure for storing information about a second class of adoption participants (e.g., adoptive parents) in accordance with the disclosed systems and methods.

FIG. 3 shows exemplary information that can be stored for each member in the second class of adoption participants 54 in records in data store 48 in the case where the second class represents adoptive parents. Two exemplary categories of information that can be stored for adoptive parents are (i) request parameters 302 that collectively define characteristics of an unborn or newly born child that the adoptive parents desire and optionally characteristics of a birth parent (or a set of birth parents) of the child and (ii) characteristics 304 of the prospective adoptive parents. In some embodiments, a record 56 for a member of the second class of adoption participants contains a biography, portfolio, and/or "Dear Birth Family" letter associated with the member.

Examples of request parameters 302 include, but are not limited to, a date baby is expected to be born, the sex of the baby, the nationality of the baby, a health requirement of the birth mother, and/or a human immunodeficiency virus status of the birth mother. Examples of characteristics 304 include, but are not limited to, age of the prospective adoptive parents, a marital status of the prospective adoptive parents, a sexual orientation of the prospective adoptive parents, a nationality of the prospective adoptive parents, a number of years the prospective adoptive parents have been married, a number of times the prospective adoptive parents have been divorced prior to marriage, a description of the health of the prospective adoptive parents, a body mass index of the prospective adoptive parents, an income of the prospective adoptive parents, the number of children the prospective adoptive parents currently have, and/or a religious orientation of the prospective adoptive parents. In this example, the request parameters 302 are used by the prospective adoptive parents to find qualifying babies while the characteristics 304 are used by birth parents to find prospective adoptive parents.

As used herein, the terms "birth parent" and "birth parents" are interchangeable unless such construction is not feasible to construe. Thus, in each instance where one birth parent of a child is referenced herein, also encompassed is the other birth parent of child when feasible. In each instance where birth parents are referenced herein, also encompassed is the case where only a single birth parent is represented when feasible. Moreover, in each instance where one adoptive parent is referenced herein, also encompassed is the spouse, domestic partner, or the significant other of the one adoptive parent when feasible. In each instance where adoptive parents or a set of adoptive parents are referenced herein, also encompassed is the case where there is only a single adoptive parent when feasible.

The above discussion describes the case where there is a single record for each member of a first class of adoption participants and each member of a second class of adoption participants. Such reference to records was made to efficiently communicate features of the disclosed systems and methods. In fact, there can be any number of records for a single adoption participant. For example, in the case where the adoption participant is a birth parent, one record could contain the characteristics that the birth parent requires in a suitable adoptive parent and another record could contain the characteristics of the child that the birth parent plans to put up for adoption and a third record could contain characteristics of the birth parent.

The use of the term "record" herein is not meant to be limiting in the sense that conventional database records must be used to store information in data store 48 about adoption participants. A "record" may be any computer readable data structure including any such data structure discussed or referenced in part three of Brookshear, *Computer Science Edition* 7, Addison Wesley, New York, 2003, pages 301-402, hereby incorporated by reference herein in its entirety, such as arrays, lists, stacks, queues, trees, customized data types, pointers to data in random access memory, files, and/or object-oriented databases.

As illustrated in FIGS. 1 through 3, system 10 comprises data structures such as a data store 48 as well as computer program modules such as a user interface module 44 and a data store query module 46. In some embodiments, some component data structures and/or computer program modules are stored on computer systems that are not illustrated by FIG. 1 but that are addressable by wide area network 34. Thus, it will be appreciated that the data store 48 and/or modules illustrated in FIG. 1 can be located on one or more remote computers. In some embodiments, data store 48 and/or program modules illustrated in FIG. 1 are on a single computer (e.g., the one illustrated in FIG. 1) and in other embodiments they are hosted by several computers (not shown). Any arrangement of data store 48 and/or computer program modules illustrated in FIG. 1 on one or more computers is within the scope of the disclosed systems and methods so long as these components are addressable with respect to each other across network 34 or other electronic means (e.g., wireless means). Thus, the disclosed systems and methods fully encompass a broad array of variants.

Data store 48 can be any form of data storage system including, but not limited to, a flat file, a relational database (SQL), or an on-line analytical processing (OLAP) database (MDX and/or variants thereof). In some specific embodiments, data store 48 is a hierarchical OLAP cube. In some specific embodiments, data store 48 comprises a star schema that is not stored as a cube but has dimension tables that define hierarchy. Still further, in some embodiments, data store 48 has hierarchy that is not explicitly broken out in the underlying database or database schema (e.g., dimension tables that are not hierarchically arranged). In some embodiments, data store 48 is a single database that includes information about a first class of participants 50 and a second class of participants 54. In other embodiments, data store 48 in fact comprises a plurality of databases that may or may not all be hosted by the same system 10. In such embodiments, some components of data store 48 are stored on computer systems that are not illustrated by FIG. 1 but that are addressable by system 10 across wide area network 34.

One aspect of the present invention comprises computer systems that can carry out any of the methods, or parts thereof, disclosed herein. Another aspect of the present invention comprises tangible computer program products that can carry out any of the methods, or parts thereof, disclosed in this application.

In some embodiments, the data store 48 is a database that is addressable by a computer controlled by a third party. In other words, in some embodiments, the data store 48 is a database that is addressable by a computer controlled by a party other than any of the adoption agencies that have access to the data store 48. In such embodiments, each of the adoption agencies that subscribe to the data store 48 have access rights to the database. In some such embodiments, adoption participants do not have direct access to the data store 48 and an adoption agency does the searching for a match, on an automated basis (without human intervention as disclosed in, for example, Section 5.3) or a manual basis, on behalf of the adoption participant. In some such embodiments, adoption participants have direct access to the data store 48 and an adoption agency does the searching for a match. In some embodiments, the third party that controls the data store 48 charges a service fee to each of the adoption agencies that are granted access to the data store 48.

5.2. Exemplary Methods

Figure 4:
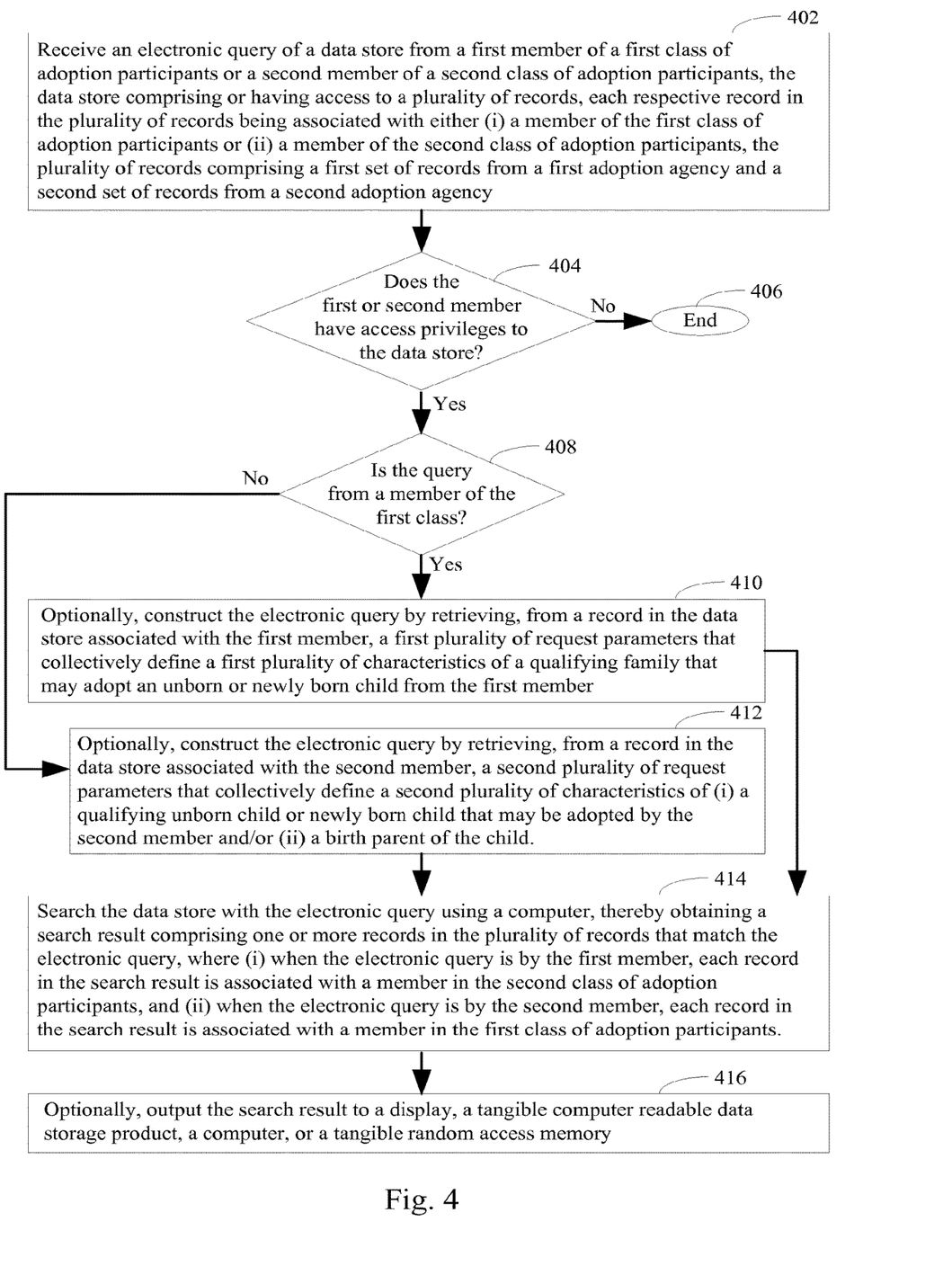
FIG. 4 illustrates exemplary processing steps for facilitating adoption in accordance with the disclosed systems and methods.

Now that an overview of an exemplary computer system has been presented, an exemplary method will be presented in conjunction with FIG. 4.

Step 402. In step 402, an electronic query of a data store 48 is received from a first member of a first class of adoption participants (e.g., birth parents) or a second member of a second class of adoption participants (e.g., adoptive parents). In some embodiments, the electronic query is received by user interface module 44. As described in more detail in Section 5.1, the data store 48 comprises or has access to a plurality of records. Each respective record in the plurality of records is associated with either (i) a member of the first class of adoption participants or (ii) a member of the second class of adoption participants. In other words, in preferred embodiments, when a record is for a member of the first class of adoption participants, it is not for a member of the second class of adoption participants. And, in preferred embodiments, when a record is for a member of the second class of adoption participants, it is not for a member of the first class of adoption participants.

A distinct advantage of the data store is that the plurality of records comprises records from more than one adoption agency. Each adoption agency finds clients, be they birth parents or adoptive parents. Adoption agencies form a database of their clients and use the database to find matches between birth parents and adoptive parents. The problem with this approach is that there is often not a sufficient pool of adoption participants (birth parents and/or adoptive parents) from which to form such matches at any one given adoption agency. The data store 48 disclosed herein solves this problem by allowing agencies to pool their databases together in a single data store 48 that may be searched on a confidential basis by the participating adoption agencies and, in some embodiments, by the adoption participants that are clients of the participating adoption agencies. Thus, in some embodiments, the data store 48 comprises a first set of records from a first adoption agency and a second set of records from a second adoption agency.

In some embodiments, the plurality of records comprises records from three or more adoption agencies, five or more adoption agencies, ten or more adoption agencies, fifty or more adoption agencies, or one hundred or more adoption agencies. In some embodiments one adoption agency that contributes records to the data store 48 is located in a first state in the United States of America and a second adoption agency that contributes records to the data store 48 is located in a second state in the United States of America. In some embodiments one adoption agency that contributes records to the data store 48 is located in a first county in the United States of America and a second adoption agency that contributes records to the data store 48 is located in a second state in the United States of America. In some embodiments one adoption agency that contributes records to the data store 48 is located in a first city and a second adoption agency that contributes records to the data store 48 is located in a second city. In some embodiments one adoption agency that contributes records to the data store 48 is located in a first country and a second adoption agency that contributes records to the data store 48 is located in a second country.

In some embodiments, there is no requirement that the electronic query be for an adoption participant that has a record in the data store 48 as long as the adoption participant has access privileges to the data store 48. For instance, in some instances, a member of the first class (e.g., birth parents) or a member of the second class (e.g., adoptive parents) engage an adoption agency but do not wish to maintain a record in data store 48. In some embodiments, the electronic query is on behalf of a first member of a first class of adoption participants (e.g., birth parents) and there is no record in the data store 48 associated with the first member. In some embodiments, the electronic query is on behalf of a second member of a second class of adoption participants (e.g. adoptive parents) and there is no record in the data store 48 associated with the second member. On the other hand, in some embodiments, the electronic query is on behalf of a first member of a first class of adoption participants (e.g., birth parents) and there is a record in the data store 48 that is associated with the first member. Further, in some embodiments, the electronic query is on behalf of a second member of a second class of adoption participants (e.g., adoptive parents) and there is a record in the data store associated with the second member.

In some embodiments, the electronic query is on behalf of a first member of a first class of adoption participants (e.g., a birth parent), and the electronic query is received by system 10 over the Internet or wide area network from a remote computer (not shown in FIG. 1) that is associated with the first member. In some embodiments, the search request is performed without human intervention when the electronic query is received from the remote computer. In other words, in some embodiments a first member of a first class of adoption participants (e.g., a birth parent) has the ability to directly search the data store 48 over the Internet or wide area network without human intervention by an adoption agency that has access to the data store 48. In such embodiments, the first member of the first class of adoption participants (e.g., a birth parent) is a client of this adoption agency and the adoption agency has granted the first member access privileges to the data store 48. In other embodiments, however, the adoption agency that has access to the data store 48 performs the search on behalf of the first member when the electronic query is received. In such embodiments, either the first member does not have direct access to the data store 48 or has requested assistance with the search.

In some embodiments, the electronic query is on behalf of a second member of a second class of adoption participants (e.g., an adoptive parent), and the electronic query is received by system 10 over the Internet or wide area network from a remote computer (not shown in FIG. 1) that is associated with the second member. In some embodiments, the search request is performed without human intervention when the electronic query is received from the remote computer. In other words, in some embodiments a second member of a second class of adoption participants (e.g., an adoptive parent) has the ability to directly search the data store 48 over the Internet or wide area network without human intervention by an adoption agency that has access to the data store 48. In such embodiments, the second member of the second class of adoption participants (e.g., an adoptive parent) is a client of this adoption agency and the adoption agency has granted the second member access privileges to the data store 48. In other embodiments, however, the adoption agency that has access to the data store 48 performs the search on behalf of the second member when the electronic query is received. In such embodiments, either the second member does not have direct access to the data store 48 or has requested assistance with the search.

Step 404. In step 404, in response to receiving the electronic query in step 402, a determination is made as to whether the first member (e.g., birth parent) or second member (e.g., adoptive parent) that initiated the electronic query has access privileges to the data store 48. Step 404 is performed because data store 48 is not available to the public. Typically, to access the data store 48, the first member of the second member is a client of an adoption agency that has access to the data store 48. Further, typically, to have access to a data store 48, the adoption agency typically contributes records of members of a first class of adoption participants (e.g., birth parents) and/or members of a second class of adoption participants (e.g., adoptive parents). In alternative embodiments, an adoption agency has access rights to the data store 48 but does not contribute records of members of a first class of adoption participants (e.g., birth parents) and/or members of a second class of adoption participants (e.g., adoptive parents) to the data store 48. In such instances, typically, the adoption agency pays for access to the data store 48. Further, in some embodiments, to have access to a data store 48, the adoption agency contributes records of members of a first class of adoption participants (e.g., birth parents) and/or members of a second class of adoption participants (e.g., adoptive parents) as well as pays for a service fee to have access to the data store 48. In various embodiments, this service fee may or may not be charged on a periodic basis and/or may be a function of one or more of the following nonlimiting exemplary factors: contingency or lack of contingency upon a number of times the adoption agency accesses the data store 48, contingency or lack of contingency upon how may records the adoption agency contributes to the data store 48, contingency or lack of contingency upon how many matches the adoption agency makes for clients of the adoption agency using the data store 48, and/or any of a number of different factors.

In some embodiments, an adoption agency that has access to data store 48 grants access to the member that initiated the electronic request, at a time before the member initiated the electronic request. In some embodiments, the access privilege is granted to the member by the adoption agency for a service fee. In some embodiments, the access privilege is granted to the member by the adoption agency because the member is a client of the adoption agency. In some embodiments, the adoption agency charges the member initiating the electronic request a one time fee or a recurring fee. In some embodiments, the adoption agency charges the member initiating electronic the request only when the member finds a match and there is a successful adoption.

In some embodiments, each member of the first class of adoption participants (e.g., birth parents) and each member of the second class of adoption participants (e.g., adoptive parents) having access to the data store 48 has their own personal login and/or password.

Step 406. If the electronic query of step 402 is for a member of the first class of adoption participants (e.g., birth parents) or second class of adoption participants (e.g., adoptive parents) that does not have access privileges to the data store 48 (either direct access privileges or via a qualifying adoption agency), the access to the data store 48 is denied (404-No), the search of the data store 48 is not performed, and the process ends (406). The process may end with a message advising the member that submitted the electronic query on instructions on how to contact an adoption agency that has access to the data store 48 in order to obtain access privileges. If the electronic query of step 402 is for a member of the first class of adoption participants (e.g., birth parents) or second class of adoption participants (e.g., adoptive parents) that has access privileges to the data store 48 (either direct access privileges or via a qualifying adoption agency), access to the data store 48 is permitted (404-Yes) and process control passes to step 408 or step 414.

Step 408. In step 408, a determination is made as to whether the electronic query of step 402 is from a member of a first class (e.g., a birth parent). In some embodiments, step 408 is not invoked because only members of a first class (e.g., birth parents) are allowed to search the data store 48 and thus the query is not necessary. For example, in some embodiments, only birth parents are allowed to search the data store 48. In some embodiments, step 408 is not invoked because only members of a second class (e.g., adoptive parents) are allowed to search the data store 48 and thus the query is not necessary. For example, in some embodiments, only adoptive parents are allowed to search the data store 48.

In FIG. 4, in the case where the electronic query of step 402 is from a member of a first class (e.g., birth parents) (408-Yes), process control passes to step 410 as illustrated. In the case where the electronic query of step 402 is from a member of a second class (e.g., adoptive parents) (408-No), process control passes to step 412. In some embodiments, query 408 is not invoked (e.g., because the electronic search query received in step 402 needs no special processing) and process control passes directly to step 414.

Step 410. Optional step 410 is reached when the electronic query of step 402 is from a member of a first class (e.g., birth parents). In this optional step, the electronic query is constructed (e.g., further defined) by retrieving, from a record in the data store 48 associated with the first member that initiated the request of step 402, a first plurality of request parameters that collectively define a first plurality of characteristics of a qualifying family that may adopt an unborn or newly born child from the first member. Optional step 410 is advantageous because it allows the first member to make numerous queries of the data store 48 over time without having to input the first plurality of characteristics each time a search is requested. Examples of such request parameters are parameters 202 disclosed in Section 5.1

Step 412. Optional step 412 is reached when the electronic query of step 402 is from a member of a second class (e.g., adoptive parents). In this optional step, the electronic query is constructed (e.g., further defined) by retrieving, from a record in the data store associated with the second member that initiated the request of step 402, a second plurality of request parameters that collectively define a second plurality of characteristics of (i) a qualifying unborn child or newly born child that may be adopted by the second member and/or (ii) a birth parent of the child. Optional step 412 is advantageous because it allows the second member to make numerous queries of the data store 48 over time without having to input the second plurality of characteristics each time a search is requested. Examples of such request parameters are parameters 302 disclosed in Section 5.1

Step 414. Regardless of whether steps 408, 410, and/or 412 are performed, process control reaches step 414. In step 414, the data store 48 is searched with the electronic query using a computer, thereby obtaining a search result comprising one or more records in the plurality of records that match the electronic query. In some embodiments, step 414 is performed by data store query module 46 (FIG. 1). When the electronic query is by a first member (e.g., a birth parent), each record in the search result is associated with a member in the second class of adoption participants (e.g., adoptive parents). When the electronic query is by a second member (e.g., an adoptive parent), each record in the search result is associated with a member in the first class of adoption participants (e.g., birth parents). In some embodiments, data store 48 only supports searches by members of the first class of adoption participants (e.g., in some embodiments, data store 48 only supports searches by birth parents). In some embodiments, data store 48 only supports searches by members of the second class of adoption participants (e.g., in some embodiments, data store 48 only supports searches by adoptive parents).

Step 416. In optional step 416, the search results are outputted to a display, a tangible computer readable data storage product, a computer, or a tangible random access memory so that the first member (e.g., birth parent) or the second member (e.g. adoptive parent) initiating the request, or an adoption agency working on behalf of the first member or the second member, can determine whether there is a suitable match.

5.3. Watch Services

Advantageously, in some embodiments, certain of the steps disclosed in FIG. 4 can be automated. For instance, rather than requiring a first or second member (or the adoption agency working for the first or second member) to manually initiate an electronic request, such requests can be set up on an automated basis using a watch service. This section describes exemplary watch services.

In some embodiments the electronic query of the data store 48 of step 402 is on behalf of a first member (e.g., a birth parent). A watch is formed that comprises a plurality of request parameters that collectively define a plurality of characteristics of a qualifying family that may adopt an unborn or newly born child from the first member is created. The data store 48 is then searched with the watch on a periodic basis (e.g., daily, weekly, biweekly, monthly). The first member is notified when a record of a second member (e.g., adoptive parent) in the data store 48 matches the watch.

In some embodiments, the electronic query of the data store 48 of step 402 is on behalf of a second member (e.g., an adoptive parent). A watch is formed that comprises a plurality of request parameters that collectively define a plurality of characteristics of (i) a qualifying unborn child or newly born child that may be adopted by the second member and, optionally, (ii) a birth parent of the unborn child or newly born child. The data store 48 is then searched with the watch on a periodic basis (e.g., daily, weekly, biweekly, monthly). The second member is notified when a record of a first member (e.g., birth parent) in the data store 48 matches the watch.

5.4. Computer and Computer Program Product Implementations

The present invention can be implemented as a computer program product that comprises a computer program mechanism embedded in a computer readable storage medium. For instance, the computer program product could contain the program modules shown in FIG. 1. These program modules may be stored on a CD-ROM, DVD, magnetic disk storage product, or any other computer readable data or program storage product. Further, any of the methods of the present invention can be implemented in one or more computers. Further still, any of the methods of the present invention can be implemented in one or more computer program products. Some embodiments of the present invention provide a computer program product that encodes any or all of the methods disclosed herein. Such methods can be stored on a CD-ROM, DVD, magnetic disk storage product, or any other computer readable data or program storage product. Such methods can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. The computer program product does not encompass a wireless transmission of a computer data signal (in which the software modules are embedded) either digitally or on a carrier wave.

Some embodiments of the present invention provide a computer program product that contains any or all of the program modules or data structures shown in FIG. 1. These program modules can be stored on a CD-ROM, DVD, magnetic disk storage product, or any other computer readable data or program storage product. The program modules can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices.

6. REFERENCES CITED

All references cited herein are incorporated herein by reference in their entirety and for all purposes to the same extent as if each individual publication or patent or patent application was specifically and individually indicated to be incorporated by reference in its entirety herein for all purposes.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A computer-implemented method comprising:
executing at least one hardware processor of a computing device, configured to access computer storage, to:
receive, via a user interface of the computing device, a request from an entity that has access privilege to the computer storage and is associated with a member that does not have access privilege to the computer storage;
determine whether the request is from the entity that is a first entity from a plurality of entities and is associated with a first member from a first class of members that does not have access privilege to the computer storage, or whether the request is from the entity that is a second entity from the plurality of entities and is associated with a second member from a second class of members that does not have access privilege to the computer storage, wherein the computer storage stores records in association with an indicator indicating a respective entity of the plurality of entities that is authorized to access a respective record, and wherein each entity in the plurality of entities is an adoption agency;
when it is determined that the request is from the first entity:

construct a first query based on the request by acquiring from the computer storage parameters associated with at least one record related to the first member, the parameters including a plurality of first characteristics of at least one adoptive parent, when a first search result matching the constructed first query is identified, acquire from the computer storage the first search result matching the constructed first query, the first search result including one or more records extracted from the computer storage, the one or more records are from a plurality of a second type of records associated with adoptive parents, and each of the one or more records is associated with a respective adoptive parent, display the first search result on the user interface, and facilitate establishment of a communication between the first member representing a child or a birth family of a child and the second member representing an adoptive parent; and when it is determined that the request is from the second entity:

construct a second query based on the request by acquiring from the computer storage parameters associated with at least one record related to the second member, the parameters including a plurality of second characteristics of a child and a birth family of the child, when a second search result matching the constructed second query is identified, acquire from the computer storage the second search result matching the constructed second query, the second search result including one or more records extracted from the computer storage, the one or more records being from a plurality of a first type of records associated with children and birth parents of children, and each of the one or more records being associated with a respective child and a birth family of the child, display the second search result on the user interface, and facilitate establishment of a communication between the first member representing a child or a birth family of a child and the second member representing an adoptive parent.

2. The computer-implemented method of claim 1, wherein the plurality of the first type of records stored in the computer storage include the at least one record related to the first member, and the plurality of the second type of records stored in the computer storage include the at least one record related to the second member.

3. The computer-implemented method of claim 1, wherein the computer storage is controlled by a third entity that is different from the plurality of entities.

4. The computer-implemented method of claim 1, wherein the request is generated automatically and periodically.

5. A computer-readable storage device comprising memory storing computer-executable instructions that, when executed by at least one processor, cause the at least one processor to:

receive, via a user interface of a computing device, a request from an entity that has access privilege to a computer storage, and is associated with a member that does not have access privilege to the computer storage;

determine whether the request is from the entity that is a first entity from a plurality of entities and is associated with a first member from a first class of members that does not have access privilege to the computer storage, or whether the request is from the entity that is a second entity from the plurality of entities and is associated with a second member from a second class of members that does not have access privilege to the computer storage, wherein the computer storage stores records in association with an indicator indicating a respective entity of the plurality of entities that is authorized to access a respective record, and wherein each entity in the plurality of entities is an adoption agency;

when it is determined that the request is from the first entity:

construct a first query based on the request by acquiring from the computer storage parameters associated with at least one record related to the first member, the parameters including a plurality of first characteristics of at least one adoptive parent, when a first search result matching the constructed first query is identified, acquire from the computer storage the first search result matching the constructed first query, the first search result including one or more records extracted from the computer storage, the one or more records are from a plurality of a second type of records associated with adoptive parents, and each of the one or more records is associated with a respective adoptive parent, display the first search result on the user interface, and facilitate establishment of a communication between the first member representing a child or a birth family of a child and the second member representing an adoptive parent; and when it is determined that the request is from the second entity:

construct a second query based on the request by acquiring from the computer storage parameters associated with at least one record related to the second member, the parameters including a plurality of second characteristics of a child and a birth family of the child, when a second search result matching the constructed second query is identified, acquire from the computer storage the second search result matching the constructed second query, the second search result including one or more records extracted from the computer storage, the one or more records being from a plurality of a first type of records associated with children and birth parents of children, and each of the one or more records being associated with a respective child and a birth family of the child, display the second search result on the user interface, and facilitate establishment of a communication between the first member representing a child or a birth family of a child and the second member representing an adoptive parent.

6. The computer-readable storage device of claim 5, wherein the plurality of the first type of records stored in the computer storage include the at least one record related to the first member, and the plurality of the second type of records stored in the computer storage include the at least one record related to the second member.

7. The computer-readable storage device of claim 5, wherein the computer storage is controlled by a third entity that is different from the plurality of entities.

8. The computer-readable storage device of claim 5, wherein the request is generated automatically and periodically.

\* \* \* \* \*